US012748722B2

(12) United States Patent
Fouda

(10) Patent No.: US 12,748,722 B2
(45) Date of Patent: Sep. 29, 2026

(54) COMPUTE IN-MEMORY ARCHITECTURE FOR CONTINUOUS ON-CHIP LEARNING

(71) Applicant: OpenAI Opco, LLC, San Francisco, CA (US)

(72) Inventor: Mohammed Elneanaei Abdelmoneem Fouda, Irvine, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 89 days.

(21) Appl. No.: 18/384,774

(22) Filed: Oct. 27, 2023

(65) Prior Publication Data

US 2024/0143541 A1 May 2, 2024

Related U.S. Application Data

(60) Provisional application No. 63/420,437, filed on Oct. 28, 2022.

(51) Int. Cl.
*G06F 15/78* (2006.01)
*G06F 15/80* (2006.01)

(52) U.S. Cl.
CPC .................................... *G06F 15/80* (2013.01)

(58) Field of Classification Search
CPC ...... G06F 15/7821; G06F 15/80; G06F 17/15; G06F 17/16; G06N 3/063; G06N 3/065
See application file for complete search history.

(56) References Cited

U.S. PATENT DOCUMENTS 11,347,477 B2 5/2022 Sumbul
11,475,300 B2 * 10/2022 Yao ........................ G06N 3/065
2009/0177867 A1 7/2009 Garde
2010/0174883 A1 7/2010 Lerner
2015/0106311 A1 4/2015 Birdwell
2018/0189631 A1 7/2018 Sumbul
2019/0102170 A1 * 4/2019 Chen ........................ G11C 7/16
2019/0102359 A1 * 4/2019 Knag .................... G11C 11/418
2019/0179795 A1 6/2019 Huang
(Continued)

FOREIGN PATENT DOCUMENTS

WO 2020190776 9/2020
WO 2022029026 2/2022

OTHER PUBLICATIONS

Chih et al., 16.4 An 89TOPS/W and 16.3TOPS/mm2 All-Digital SRAM-Based Full-Precision Compute—In Memory Macro in 22nm for Machine-Learning Edge Applications, In Proc. IEEE Int. Solid-State Circuits Conf.(ISSCC), vol. 64, 2021, pp. 252-254.
(Continued)

*Primary Examiner* — Jacob Petranek
(74) *Attorney, Agent, or Firm* — FINNEGAN, HENDERSON, FARABOW, GARRETT & DUNNER, LLP

(57) ABSTRACT

A system capable of providing on-chip learning comprising a processor and a plurality of compute engines coupled with the processor. Each of the compute engines including a compute-in-memory (CIM) hardware module and a local update module. The CIM hardware module stores a plurality of weights corresponding to a matrix and is configured to perform a vector-matrix multiplication for the matrix. The local update module is coupled with the CIM hardware module and configured to update at least a portion of the weights.

20 Claims, 9 Drawing Sheets

(56) References Cited

U.S. PATENT DOCUMENTS

| | | | | |
|---|---|---|---|---|
| 2019/0205741 | A1 | 7/2019 | Gupta | |
| 2019/0340486 | A1 | 11/2019 | Mills | |
| 2019/0348110 | A1 | 11/2019 | Sinangil | |
| 2019/0362227 | A1 | 11/2019 | Seshadri | |
| 2020/0057938 | A1 | 2/2020 | Lu | |
| 2020/0207656 | A1 | 7/2020 | Yoshioka | |
| 2020/0293284 | A1 | 9/2020 | Vantrease | |
| 2020/0320403 | A1 | 10/2020 | Daga | |
| 2020/0410337 | A1 | 12/2020 | Huang | |
| 2021/0097431 | A1 | 4/2021 | Olgiati | |
| 2021/0158132 | A1 | 5/2021 | Huynh | |
| 2021/0224185 | A1* | 7/2021 | Zhou | G06F 15/7821 |
| 2021/0343343 | A1* | 11/2021 | Teague | G11C 16/26 |
| 2022/0004497 | A1 | 1/2022 | Willcock | |
| 2022/0019880 | A1 | 1/2022 | Dasgupta | |
| 2022/0114270 | A1 | 4/2022 | Wang | |
| 2022/0138286 | A1 | 5/2022 | Zage | |
| 2022/0164916 | A1 | 5/2022 | Nurvitadhi | |
| 2022/0207293 | A1 | 6/2022 | Yao | |
| 2022/0207656 | A1 | 6/2022 | Yao | |
| 2022/0244916 | A1* | 8/2022 | Lee | G06F 7/5443 |
| 2022/0301605 | A1* | 9/2022 | Mirhaj | G11C 7/1051 |
| 2022/0309328 | A1* | 9/2022 | Saxena | G06N 3/08 |
| 2022/0318610 | A1 | 10/2022 | Seo | |
| 2022/0414432 | A1 | 12/2022 | Banitalebi Dehkordi | |
| 2023/0014565 | A1 | 1/2023 | Ray | |
| 2023/0045840 | A1* | 2/2023 | Chih | G11C 7/1006 |
| 2023/0047364 | A1 | 2/2023 | Badaroglu | |
| 2023/0074229 | A1 | 3/2023 | Jia | |
| 2023/0138695 | A1 | 5/2023 | Kumar | |
| 2023/0146647 | A1 | 5/2023 | Byeon | |
| 2023/0206044 | A1 | 6/2023 | Ma | |
| 2023/0259456 | A1 | 8/2023 | Verma | |
| 2023/0297580 | A1 | 9/2023 | Sheng | |
| 2023/0316060 | A1* | 10/2023 | Jain | G06N 3/063<br>706/33 |
| 2023/0359894 | A1 | 11/2023 | Kim | |
| 2024/0094986 | A1 | 3/2024 | Lyubomirsky | |
| 2024/0134606 | A1 | 4/2024 | Yi | |
| 2024/0169201 | A1 | 5/2024 | Seok | |

OTHER PUBLICATIONS

Li et al., A Precision-Scalable Energy-Efficient Bit-Split-and-Combination Vector Systolic Accelerator for NAS-Optimized DNNs on Edge, 2022 Design, Automation & Test in Europe Conference & Exhibition, 2022, pp. 730-735.

Mori et al., A 4nm 6163-TOPS/W/b 4790-TOPS/mm2/b SRAM Based Digital-Computing-in-Memory Macro Supporting Bit-Width Flexibility and Simultaneous MAC and Weight Update, In 2023 IEEE International Solid-State Circuits Conference (ISSCC), Feb. 2023, pp. 132-134.

Song et al., PipeLayer: A Pipelined ReRAM-Based Accelerator for Deep Learning, 2017.

Korthikanti et al., Reducing Activation Recomputation in Large Transformer Models, May 10, 2022, pp. 1-17.

Lee et al., A 12nm 121-TOPS/W 41.6-TOPS/mm2 All Digital Full Precision SRAM-based Compute-in-Memory with Configurable Bit-width for AI Edge Applications, 2022 Symposium on VLSI Technology & Circuits Digest of Technical Papers, pp. 24-25.

Kim et al., MONETA: A Processing-In-Memory-Based Hardware Platform for the Hybrid Convolutional Spiking Neural Network with Online Learning, Frontiers in Neuroscience, vol. 16, Apr. 11, 2022.

Lin et al., A Novel Voltage-Accumulation Vector-Matrix Multiplication Architecture using Resistor-Shunted Floating Gate Flash Memory Device for Low-Power and High-Density Neural Network Applications, 2018 IEEE International Electron Devices Meeting (IEDM), Dec. 5, 2018, 4 pages.

* cited by examiner

1100

COMPUTE IN-MEMORY ARCHITECTURE FOR CONTINUOUS ON-CHIP LEARNING

CROSS REFERENCE TO OTHER APPLICATIONS

This application claims priority to U.S. Provisional Patent Application No. 63/420,437 entitled COMPUTE IN-MEMORY ARCHITECTURE FOR CONTINUOUS ON-CHIP LEARNING filed Oct. 28, 2022 which is incorporated herein by reference for all purposes.

BACKGROUND OF THE INVENTION

Artificial intelligence (AI), or machine learning, utilizes learning networks loosely inspired by the brain in order to solve problems. Learning networks typically include layers of weights that weight signals (mimicking synapses) combined with activation layers that apply functions to the signals (mimicking neurons). The weight layers are typically interleaved with the activation layers. Thus, the weight layer provides weighted input signals to an activation layer. Neurons in the activation layer operate on the weighted input signals by applying some activation function (e.g. ReLU or Softmax) and provide output signals corresponding to the statuses of the neurons. The output signals from the activation layer are provided as input signals to the next weight layer, if any. This process may be repeated for the layers of the network. Learning networks are thus able to reduce complex problems to a set of weights and the applied activation functions. The structure of the network (e.g., number of layers, connectivity among the layers, dimensionality of the layers, the type of activation function, etc.) are together known as a model. Learning networks can leverage hardware, such as graphics processing units (GPUs) and/or AI accelerators, which perform operations usable in machine learning in parallel. Such tools can dramatically improve the speed and efficiency with which data-heavy and other tasks can be accomplished by the learning network.

In order to be used in data-heavy tasks and/or other applications, the learning network is trained prior to its use in an application. Training involves determining an optimal (or near optimal) configuration of the high-dimensional and nonlinear set of weights. In other words, the weights in each layer are determined, thereby identifying the parameters of a model. Supervised training may include evaluating the final output signals of the last layer of the learning network based on a set of target outputs (e.g., the desired output signals) for a given set of input signals and adjusting the weights in one or more layers to improve the correlation between the output signals for the learning network and the target outputs. Once the correlation is sufficiently high, training may be considered complete.

Although training can result in a learning network capable of solving challenging problems, training may be time-consuming. In addition, once training is completed, the model is deployed for use. This may include copying the weights into a memory (or other storage) of the device on which the model is desired to be used. This process may further delay use of the model. Accordingly, what is desired is an improved technique for training and/or using learning networks.

BRIEF DESCRIPTION OF THE DRAWINGS

Various embodiments of the invention are disclosed in the following detailed description and the accompanying drawings.

DETAILED DESCRIPTION

Figure 1:
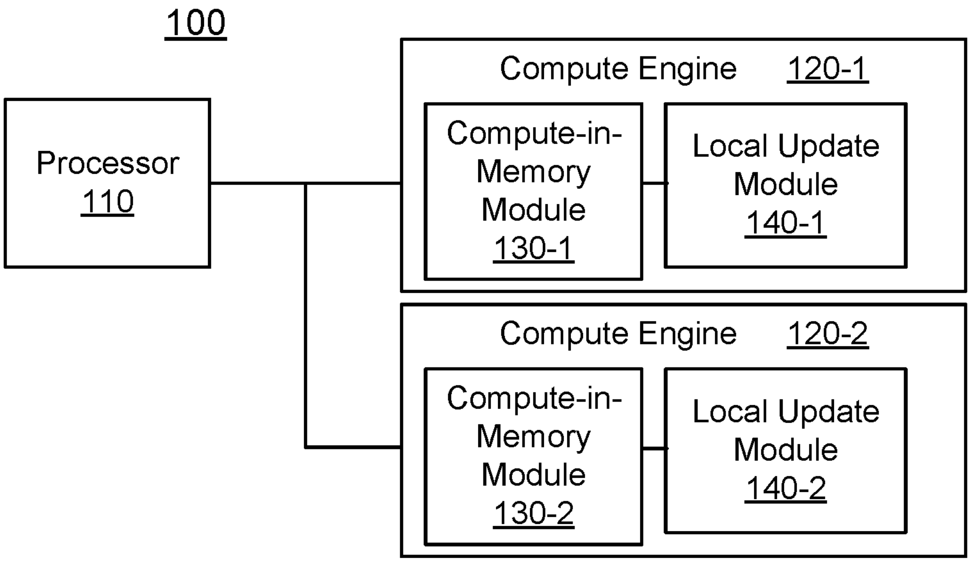
FIG. 1 is a diagram depicting an embodiment of a system usable in an AI accelerator and capable of performing on-chip learning.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system capable of providing on-chip learning is described. The system includes a processor and multiple compute engines coupled with the processor. Each of the compute engines including a compute-in-memory (CIM) hardware module and a local update module. The memory within the CIM hardware module stores a plurality of weights corresponding to a matrix and is configured to perform a vector-matrix multiplication for the matrix. The local update module is coupled with the CIM hardware module and configured to update at least a portion of the weights.

In some embodiments, each CIM hardware module includes cells for storing the weights. The cells may be selected from analog static random access memory (SRAM) cells, digital SRAM cells, and resistive random access memory (RRAM) cells. In some embodiments, the cell includes the analog SRAM cells. In such embodiments, the CIM hardware module further includes a capacitive voltage divider for each analog SRAM cell. Similarly, in other embodiments, the capacitive voltage dividers may be used in conjunction with other types of memory cells. In some embodiments, the weights include at least one positive weight and at least one negative weight.

In some embodiments, the local update module further includes an adder and write circuitry. The adder is configured to be selectively coupled with each cell, to receive a weight update, and to add the weight update with a weight for each cell. The write circuitry is coupled with the adder and the cells. The write circuitry is configured to write a sum of the weight and the weight update to each cell. In some embodiments, the local update module further includes a local batched weight update calculator coupled with the adder and configured to determine the weight update. In some embodiments, each of the compute engines further includes address circuitry configured to selectively couple the adder and the write circuitry with each of the plurality of cells. In some embodiments, the address circuitry locates the target cells using a given address.

Each compute engine may also include a controller configured to provide control signals to the CIM hardware module and the local update module. A first portion of the control signals corresponds to an inference mode. A second portion of the control signals corresponds to a weight update module. In some embodiments, the system includes a scaled vector accumulation (SVA) unit coupled with the compute engines and the processor. The SVA unit is configured to apply an activation function to an output of the compute engines. The SVA unit and the compute engines may be provided in tiles.

A machine learning system is also described. The machine learning system includes at least one processor and tiles coupled with the processor(s). Each tile includes compute engines and at least one scaled vector accumulation (SVA) unit. In some embodiments, the SVA unit is configured to apply an activation function to an output of the compute engines. In other embodiments, the SVA may apply an activation function to signals flowing within the compute engine. The compute engines are interconnected and coupled with the SVA unit. Each compute engine includes a compute-in-memory (CIM) hardware module, a controller, and a local update module. The CIM hardware module includes a plurality of static random access memory (SRAM) cells storing a plurality of weights corresponding to a matrix. The CIM hardware module is configured to perform a vector-matrix multiplication for the matrix. The local update module is coupled with the CIM hardware module and configured to update at least a portion of the weights. The controller is configured to provide a plurality of control signals to the CIM hardware module and the local update module. A first portion of the control signals corresponds to an inference mode, while a second portion of the control signals corresponds to a weight update mode. In some embodiments, each compute engine further includes an adder, write circuitry, and address circuitry. The adder is configured to be selectively coupled with each of the SRAM cells. to receive a weight update, and to add the weight update with a weight for each of the SRAM cells. The write circuitry is coupled with the adder and the SRAM cells. The write circuitry is configured to write a sum of the weight and the weight update to each of the SRAM cells. The address circuitry is configured to selectively couple the adder and the write circuitry with each of the SRAM cells.

A method is described. The method includes providing an input vector to compute engines coupled with a processor. Each of the compute engines includes a compute-in-memory (CIM) hardware module and a local update module. The CIM hardware module stores weights corresponding to a matrix in cells. The CIM hardware module is configured to perform a vector-matrix multiplication for the matrix. The local update module is coupled with the CIM hardware module and configured to update at least a portion of the weights. The vector-matrix multiplication of the input vector and the matrix is performed using the compute engines. The weight update(s) for the weights is determined. The method also includes locally updating the weights using the weight update(s) and the local update module.

The cells may be selected from analog static random access memory (SRAM) cells, digital SRAM cells, and resistive random access memory (RRAM) cells. In some embodiments, locally updating further includes adding the weight update(s) to a weight of at least a portion of the weights for each of the cells using the local update module. In some embodiments the method includes adding, using an adder configured to be selectively coupled with each of the cells, the weight update(s) to a weight of at least a portion of the weights for each cell. The method also includes writing, using write circuitry coupled with the adder and the plurality of cells, a sum of the weight and the weight update to each of the cells. In some embodiments, the weights include positive and/or negative weight(s). The method may also include applying an activation function to an output of the compute engines. Applying the activation function may include using a scaled vector accumulation (SVA) unit coupled with the compute engines to apply the activation function to the output.

FIG. 1 depicts system 100 usable in a learning network. System 100 may be an artificial intelligence (AI) accelerator that can be deployed for using a model (not explicitly depicted) and for allowing for on-chip training of the model (otherwise known as on-chip learning). System 100 may thus be implemented as a single integrated circuit. System 100 includes processor 110 and compute engines 120-1 and 120-2 (collectively or generically compute engines 120). Other components, for example a cache or another additional memory, mechanism(s) for applying activation functions, and/or other modules, may be present in system 100. Although a single processor 110 is shown, in some embodiments multiple processors may be used. In some embodiments, processor 110 is a reduced instruction set computer (RISC) processor. In other embodiments, different and/or additional processor(s) may be used. Processor 110 implements instruction set(s) used in controlling compute engines 120.

Compute engines 120 are configured to perform, efficiently and in parallel, tasks used in training and/or using a model. Although two compute engines 120 are shown, another number (generally more) may be present. Compute engines 120 are coupled with and receive commands from processor 110. Compute engines 120-1 and 120-2 include compute-in-memory (CIM) modules 130-1 and 130-2 (collectively or generically CIM module 130) and local update (LU) modules 140-1 and 140-3 (collectively or generically LU module 140). Although one CIM module 130 and one LU module 140 is shown in each compute engine 120, a compute engine may include another number of CIM modules 130 and/or another number of LU modules 140. For example, a compute engine might include three CIM modules 130 and one LU module 140, one CIM module 130 and two LU modules 140, or two CIM modules 130 and two LU modules 140.

CIM module 130 is a hardware module that stores data and performs operations. In some embodiments, CIM module 130 stores weights for the model. CIM module 130 also performs operations using the weights. More specifically, CIM module 130 performs vector-matrix multiplications, where the vector may be an input vector provided using processor 110 and the matrix may be weights (i.e. data/parameters) stored by CIM module 130. Thus, CIM module 130 may be considered to include a memory (e.g. that stores the weights) and compute hardware (e.g. that performs the vector-matrix multiplication of the stored weights). In some embodiments, the vector may be a matrix (i.e. an n×m vector where n>1 and m>1). For example, CIM module 130 may include an analog static random access memory (SRAM) having multiple SRAM cells and configured to provide output(s) (e.g. voltage(s)) corresponding to the data (weight/parameter) stored in each cell of the SRAM multiplied by a corresponding element of the input vector. In some embodiments CIM module 130 may include a digital static SRAM having multiple SRAM cells and configured to provide output(s) corresponding to the data (weight/parameter) stored in each cell of the digital SRAM multiplied by a corresponding element of the input vector. In some embodiments, CIM module 130 may include an analog resistive random access memory (RAM) configured to provide output (e.g. voltage(s)) corresponding to the impedance of each cell multiplied by the corresponding element of the input vector. Other configurations of CIM module 230 are possible. Each CIM module 130 thus stores weights corresponding to a matrix in its cells and is configured to perform a vector-matrix multiplication of the matrix with an input vector.

In order to facilitate on-chip learning, LU modules 140 are provided. LU modules 140-1 and 140-2 are coupled with the corresponding CIM modules 130-1 and 130-2, respectively. LU modules 140 are used to update the weights (or other data) stored in CIM modules 130. LU modules 140 are considered local because LU modules 140 are in proximity and CIM modules 130. For example, LU modules 140 may reside on the same integrated circuit as CIM modules 130. In some embodiments LU modules 140-1 and 140-2 for a particular compute engine reside in the same integrated circuit as the CIM modules 130-1 and 130-2, respectively, for the compute engine 120-1 and 120-2. In some embodiments, LU module 140 is considered local because it is fabricated on the same substrate (e.g. the same silicon wafer) as the corresponding CIM module 130. In some embodiments, LU modules 140 are also used in determining the weight updates. In other embodiments, a separate component may calculate the weight updates. For example, in addition to or in lieu of LU modules 140, the weight updates may be determined by processor 110, in software by other processor(s) not part of system 100 (not shown), by other hardware that is part of system 100, by other hardware outside of system 100, and/or some combination thereof.

System 100 may thus be considered to form some or all of a learning network. Such a learning network typically includes layers of weights (corresponding to synapses) interleaved with activation layers (corresponding to neurons). In operation, a layer of weights receives an input signal and outputs a weighted signal that corresponds to a vector-matrix multiplication of the input signal with the weights. An activation layer receives the weighted signal from the adjacent layer of weights and applies the activation function, such as a ReLU or sigmoid. The output of the activation layer may be provided to another weight layer or an output of the system. One or more of the CIM modules 130 corresponds to a layer of weights. For example, if all of the weights in a layer can be stored in the cells of CIM module 130, then system 100 may correspond to two layers of weights. In such a case, the input vector may be provided (e.g. from a cache, from a source not shown as part of system 100, or from another source) to CIM module 130-1. CIM module 130-1 performs a vector-matrix multiplication of the input vector with the weights stored in its cells. The weighted output may be provided to component(s) corresponding to an activation layer. For example, processor 110 may apply the activation function and/or other component(s) (not shown) may be used. The output of the activation layer may be provided to CIM module 130-2. CIM module 130-2 performs a vector-matrix multiplication of the input vector (the activation layer) with the weights stored in its cells. The output may be provided to another activation layer, such as processor 110 and/or other component(s) (not shown). If all of the weights in a weight layer cannot be stored in a single CIM module 130, then CIM modules 130 may include only a portion of the weights in a weight layer. In such embodiments, portion(s) of the same input vector may be provided to each CIM module 130. The output of CIM modules 130 is provided to an activation layer. Thus, inferences may be performed using system 100. During training of the learning network, updates to the weights in the weight layer(s) are determined. Thus, the weights in (i.e. parameters stored in cells of) CIM modules 130 are updated using LU modules 140.

Using system 100, efficiency and performance of a learning network may be improved. Use of CIM modules 130 may dramatically reduce the time to perform the vector-matrix multiplication that provides the weighted signal. Thus, performing inference(s) using system 100 may require less time and power. This may improve efficiency of training and use of the model. LU modules 140 allow for local updates to the weights in CIM modules 130. This may reduce the data movement that may otherwise be required for weight updates. Consequently, the time taken for training may be greatly reduced. In some embodiments, the time taken for a weight update using LU modules 140 may be an order of magnitude less (i.e. require one-tenth the time) than if updates are not performed locally. Efficiency and performance of a learning network provided using system 100 may be increased.

Figure 2:
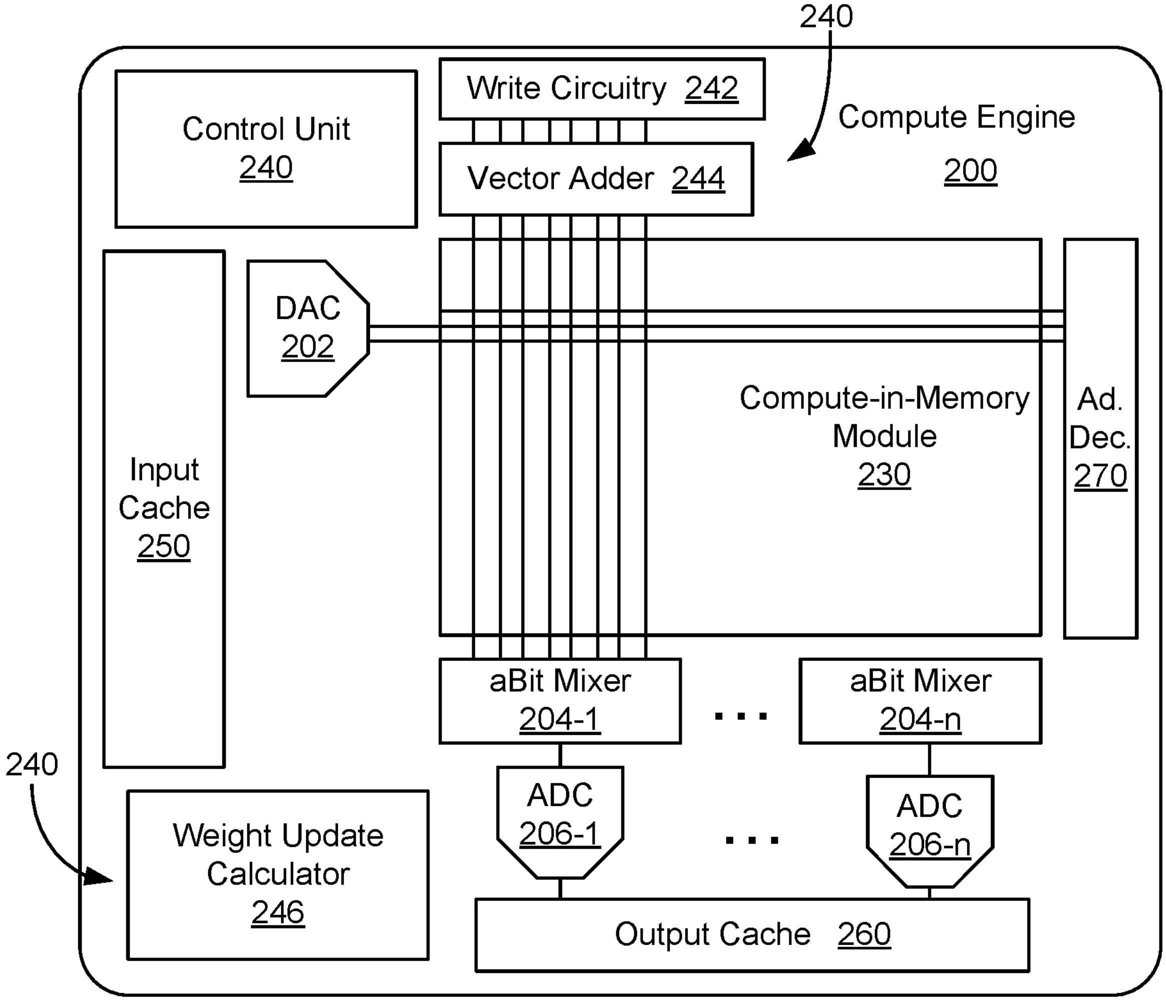
FIG. 2 depicts an embodiment of a hardware compute engine usable in an AI accelerator and capable of performing local updates.

FIG. 2 depicts an embodiment of compute engine 200 usable in an AI accelerator and capable of performing local updates. Compute engine 200 may be a hardware compute engine analogous to compute engines 120. Compute engine

200 thus includes CIM module 230 and LU module 240 analogous to CIM modules 130 and LU modules 140, respectively. Compute engine 200 also includes analog bit mixer (aBit mixer) 204-1 through 204-*n* (generically or collectively 204), analog to digital converter(s) (ADC(s)) 206-1 through 206-*n* (generically or collectively 206), input cache 250, output cache 260, and address decoder 270. Although particular numbers of components 202, 204, 206, 230, 240, 242, 244, 246, 360, and 270 are shown, another number of one or more components 202, 204, 206, 230, 240, 242, 244, 246, 360, and 270 may be present.

CIM module 230 is a hardware module that stores data corresponding to weights and performs vector-matrix multiplications. The vector is an input vector provided to CIM module 230 (e.g. via input cache 250) and the matrix includes the weights stored by CIM module 230. In some embodiments, the vector may be a matrix. Examples of embodiments CIM modules that may be used in CIM module 230 are depicted in FIGS. 3, 4, and 5.

Figure 3:
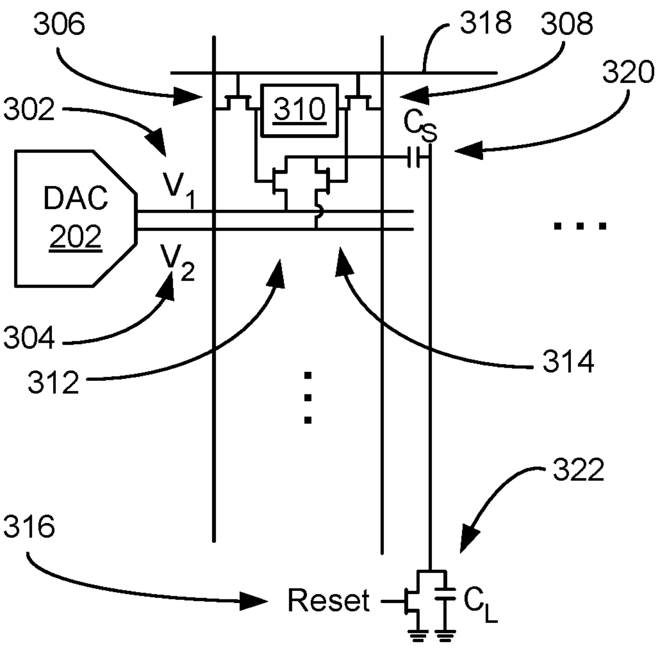
FIG. 3 depicts an embodiment of a portion of a compute-in-memory module usable in an AI accelerator.

FIG. 3 depicts an embodiment of a cell in one embodiment of an SRAM CIM module usable for CIM module 230. Also shown is DAC 202 of compute engine 200. For clarity, only one SRAM cell 310 is shown. However, multiple SRAM cells 310 may be present. For example, multiple SRAM cells 310 may be arranged in a rectangular array. An SRAM cell 310 may store a weight or a part of the weight. The CIM module shown includes lines 302, 304, and 318, transistors 306, 308, 312, 314, and 316, capacitors 320 ($C_S$) and 322 ($C_L$). In the embodiment shown in FIG. 3, DAC 202 converts a digital input voltage to differential voltages, $V_1$ and $V_2$, with zero reference. These voltages are coupled to each cell within the row. DAC 202 is thus used to temporal code differentially. Lines 302 and 304 carry voltages $V_1$ and $V_2$, respectively, from DAC 202. Line 318 is coupled with address decoder 270 (not shown in FIG. 3) and used to select cell 310 (and, in the embodiment shown, the entire row including cell 310), via transistors 306 and 308.

In operation, voltages of capacitors 320 and 322 are set to zero, for example via Reset provided to transistor 316. DAC 202 provides the differential voltages on lines 302 and 304, and the address decoder (not shown in FIG. 3) selects the row of cell 310 via line 318. Transistor 312 passes input voltage $V_1$ if SRAM cell 310 stores a logical 1, while transistor 314 passes input voltage $V_2$ if SRAM cell 310 stores a zero. Consequently, capacitor 320 is provided with the appropriate voltage based on the contents of SRAM cell 310. Capacitor 320 is in series with capacitor 322. Thus, capacitors 320 and 322 act as capacitive voltage divider. Each row in the column of SRAM cell 310 contributes to the total voltage corresponding to the voltage passed, the capacitance, $C_S$, of capacitor 320, and the capacitance, $C_L$, of capacitor 322. Each row contributes a corresponding voltage to the capacitor 322. The output voltage is measured across capacitor 322. In some embodiments, this voltage is passed to the corresponding aBit mixer 204 for the column. In some embodiments, capacitors 320 and 322 may be replaced by transistors to act as resistors, creating a resistive voltage divider instead of the capacitive voltage divider. Thus, using the configuration depicted in FIG. 3, CIM module 230 may perform a vector-matrix multiplication using data stored in SRAM cells 310.

Figure 4:
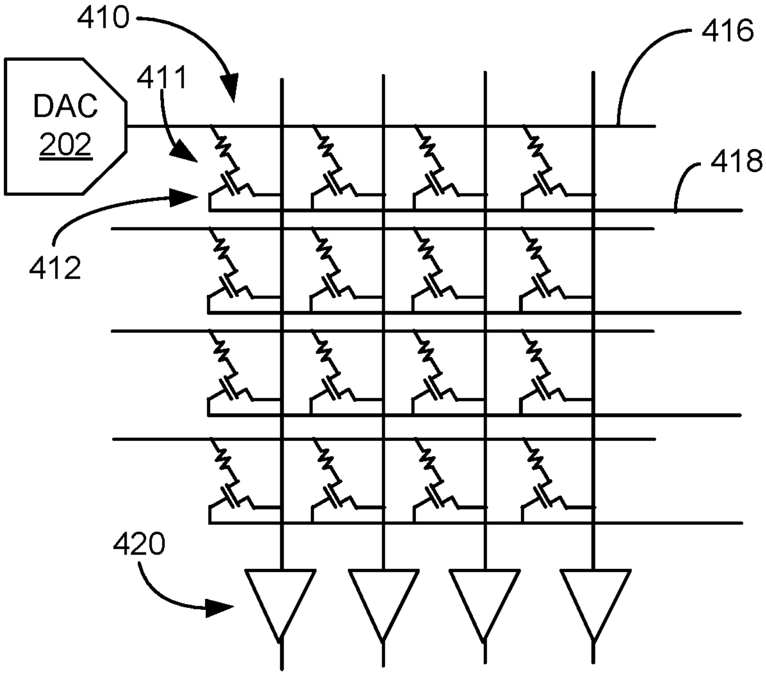
FIG. 4 depicts an embodiment of a portion of a compute-in-memory module usable in an AI accelerator.
Figure 5:
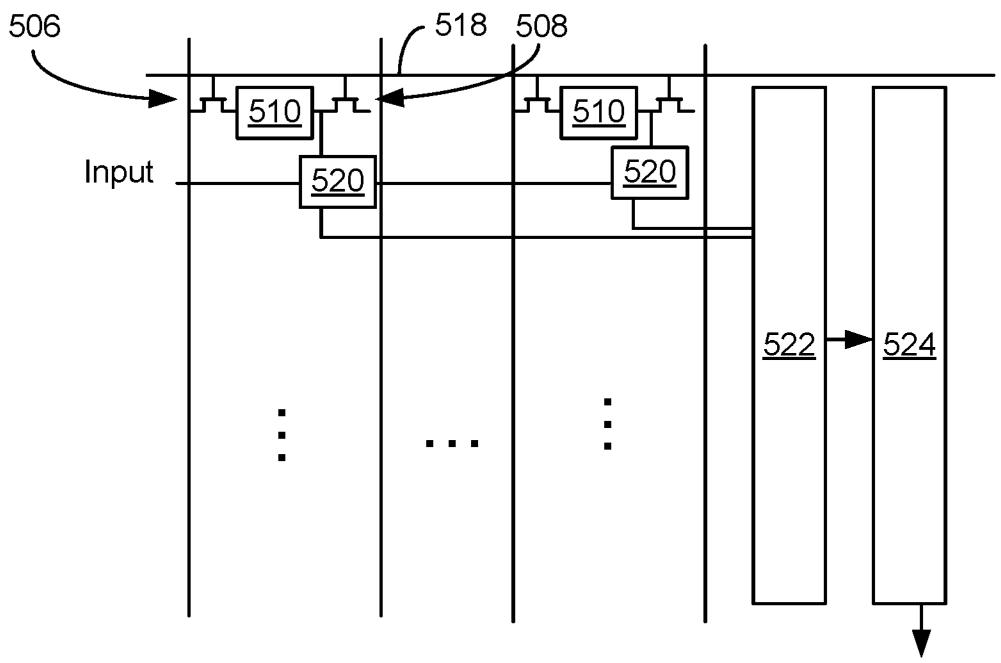
FIG. 5 depicts an embodiment of a portion of a compute-in-memory module usable in an AI accelerator.

FIG. 4 depicts an embodiment of a cell in one embodiment of a resistive CIM module usable for CIM module 230. Also shown is DAC 202 of compute engine 200. For clarity, only one resistive cell 410 is labeled. However, multiple cells 410 are present and arranged in a rectangular array (i.e. a crossbar array in the embodiment shown). Also labeled are corresponding lines 416 and 418 and current-to-voltage sensing circuit 420. Each resistive cell includes a programmable impedance 411 and a selection transistor 412 coupled with line 418. Bit slicing may be used to realize high weight precision with multi-level cell devices.

In operation, DAC 202 converts digital input data to an analog voltage that is applied to the appropriate row in the crossbar array via line 416. The row for resistive cell 410 is selected by address decoder 270 (not shown in FIG. 4) by enabling line 418 and, therefore, transistor 412. A current corresponding to the impedance of programmable impedance 411 is provided to current-to-voltage sensing circuit 420. Each row in the column of resistive cell 411 provides a corresponding current. Current-to-voltage sensing circuit 420 senses the partial sum current from and to convert this to voltage. In some embodiments, this voltage is passed to the corresponding aBit mixer 204 for the column. Thus, using the configuration depicted in FIG. 4, CIM module 230 may perform a vector-matrix multiplication using data stored in resistive cells 410.

FIG. 5 depicts an embodiment of a cell in one embodiment of a digital SRAM module usable for CIM module 230. For clarity, only one digital SRAM cell 510 is labeled. However, multiple cells 510 are present and may be arranged in a rectangular array. Also labeled are corresponding transistors 506 and 508 for each cell, line 518, logic gates 520, adder tree 522 and digital mixer 524. Because the SRAM module shown in FIG. 5 is digital, DACs 202, aBit mixers 204, and ADCs 206 may be omitted from compute engine 200 depicted in FIG. 2.

In operation, a row including digital SRAM cell 510 is enabled by address decoder 270 (not shown in FIG. 5) using line 518. Transistors 506 and 508 are enabled, allowing the data stored in digital SRAM cell 510 to be provided to logic gates 520. Logic gates 520 combine the data stored in digital SRAM cell 510 with the input vector. Thus, the binary weights stored in digital SRAM cells 510 are combined with the binary inputs. The output of logic gates 520 are accumulated in adder tree 522 and combined by digital mixer 524. Thus, using the configuration depicted in FIG. 5, CIM module 230 may perform a vector-matrix multiplication using data stored in digital SRAM cells 510.

Referring back to FIG. 2, CIM module 230 thus stores weights corresponding to a matrix in its cells and is configured to perform a vector-matrix multiplication of the matrix with an input vector. In some embodiments, compute engine 200 stores positive weights in CIM module 230. However, the use of both positive and negative weights may be desired for some models and/or some applications. In such cases, bipolar weights (e.g. having range −S through +S) are mapped to a positive range (e.g. 0 through S). For example, a matrix of bipolar weights, W, may be mapped to a positive weight matrix $W_p$ such that: $Wx=(W_p-SJ/2)(2x)=2W_px-S\Sigma_ix_i$. where J is a matrix of all ones having the same size as W and S is the maximum value of the weight (e.g. $2^{N-1}-1$ for an N-bit weight). For simplicity, compute engine 200 is generally discussed in the context of CIM module 230 being an analog SRAM CIM module analogous to that depicted in FIG. 3.

Input cache 250 receives an input vector for which a vector-matrix multiplication is desired to be performed. In some embodiments, the input vector is provided to input cache by a processor, such as processor 110. The input vector may be read from a memory, from a cache or register in the processor, or obtained in another manner. Digital-to-analog converter (DAC) 202 converts a digital input vector to analog in order for CIM module 230 to operate on the vector. Although shown as connected to only some portions of CIM module 230, DAC 202 may be connected to all of the cells of CIM module 230. Alternatively, multiple DACs 202 may be used to connect to all cells of CIM module 230. Address decoder 270 includes address circuitry configured to selectively couple vector adder 144 and write circuitry 242 with each cell of CIM module 230. Address decoder 270 selects the cells in CIM module 230. For example, address decoder 270 may select individual cells, rows, or columns to be updated, undergo a vector-matrix multiplication, or output the results.

Figure 6:
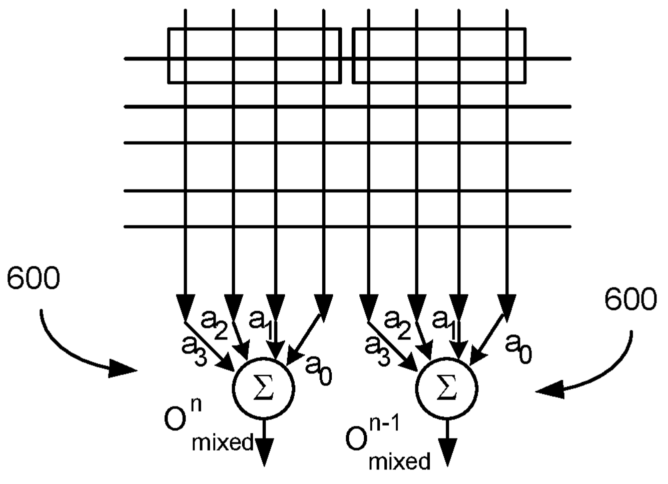
FIG. 6 depicts an embodiment of an analog bit mixer usable in an AI accelerator.

In some embodiments, aBit mixer 204 combines the results from CIM module 230. Use of aBit mixer 204 may save on ADCs 206 and allows access to analog output voltages. FIG. 6 depicts an embodiment of aBit mixer 600 usable for aBit mixers 204 of compute engine 200. aBit mixer 600 may be used with exponential weights to realize the desired precision. aBit mixer 600 utilizes bit slicing such that the weighted mixed output is given by:

$$O_{mixed} = \sum_{p=0}^{P-1} a_p O_p$$

where $O_{mixed}$ is a weighted summation of each column, $O_p$, and $a_p$ is the weight corresponding to p bit. In some embodiments, this may be implemented using weighted capacitors that employ charge sharing. In some embodiments, weights are exponentially spaced to allow for a wider dynamic range, for example by applying μ-law algorithm.

ADC(s) 206 convert the analog resultant of the vector-matrix multiplication to digital form. Output cache 260 receives the result of the vector-matrix multiplication and outputs the result from compute engine 200. Thus, a vector-matrix multiplication may be performed using CIM module 230.

LU module 240 includes write circuitry 242 and vector adder 244. In some embodiments, LU module 240 includes weight update calculator 246. In other embodiments, weight update calculator 246 may be a separate component and/or may not reside within compute engine 200. Weigh update calculator 246 is used to determine how to update to the weights stored in CIM module 230. In some embodiments, the updates are determined sequentially based upon target outputs for the learning system of which compute engine 200 is a part. In some embodiments, the weight update provided may be sign-based (e.g. increments for a positive sign in the gradient of the loss function and decrements for a negative sign in the gradient of the loss function). In some embodiments, the weight update may be ternary (e.g. increments for a positive sign in the gradient of the loss function, decrements for a negative sign in the gradient of the loss function, and leaves the weight unchanged for a zero gradient of the loss function). Other types of weight updates may be possible. In some embodiments, weight update calculator 246 provides an update signal indicating how each weight is to be updated. The weight stored in a cell of CIM module 230 is sensed and is increased, decreased, or left unchanged based on the update signal. In particular, the weight update may be provided to vector adder 244, which also reads the weight of a cell in CIM module 230. More specifically, adder 244 is configured to be selectively coupled with each cell of CIM module by address decoder 270. Vector adder 244 receives a weight update and adds the weight update with a weight for each cell. Thus, the sum of the weight update and the weight is determined. The resulting sum (i.e. the updated weight) is provided to write circuitry 242. Write circuitry 242 is coupled with vector adder 244 and the cells of CIM module 230. Write circuitry 242 writes the sum of the weight and the weight update to each cell. In some embodiments, LU module 240 further includes a local batched weight update calculator (not shown in FIG. 2) coupled with vector adder 244. Such a batched weight update calculator is configured to determine the weight update.

Compute engine 200 may also include control unit 240. Control unit 240 generates the control signals depending on the operation mode of compute engine 200. Control unit 240 is configured to provide control signals to CIM hardware module 230 and LU module 249. Some of the control signals correspond to an inference mode. Some of the control signals correspond to a training, or weight update mode. In some embodiments, the mode is controlled by a control processor (not shown in FIG. 2, but analogous to processor 110) that generates control signals based on the Instruction Set Architecture (ISA).

In inference mode, the input data is multiplied by the stored weights and output is obtained after ADC 206. This mode may include many steps. For example, if capacitors arranged in a voltage divider are used to provide the output (e.g. in FIG. 3), the capacitors (or other storage elements) may be reset. For example, capacitors are rest to either zero or certain precharge value depending on the functionality of the capacitor. Capacitive voltage divider operation is enabled to provide the output of the vector-matrix-multiplication. aBit mixer 204 is enabled. ADC(s) 206 are also enabled. Data are stored in output cache 260 to be passed to the compute engine or other desired location(s). This process may be repeated for the entire vector multiplication. In weight update mode, the weight update signals may be generated sequentially by weight update calculator 246. In parallel, cells in a row of CIM module 230 are read row by row and passed to adder 244 for the corresponding weight update.

Using compute engine 200, efficiency and performance of a learning network may be improved. CIM module 230 may dramatically reduce the time to perform the vector-matrix multiplication. Thus, performing inference(s) using compute engine 200 may require less time and power. This may improve efficiency of training and use of the model. LU module 240 uses components 242, 244, and 246 to perform local updates to the weights stored in the cells of CIM module 230. This may reduce the data movement that may otherwise be required for weight updates. Consequently, the time taken for training may be dramatically reduced. Efficiency and performance of a learning network provided using compute engine 200 may be increased.

Figure 7:
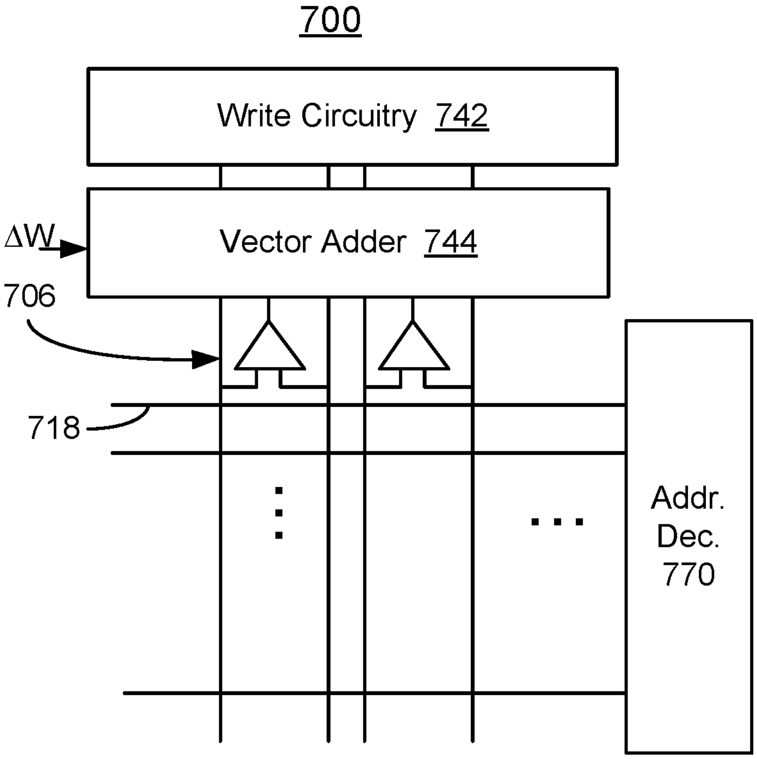
FIG. 7 depicts an embodiment of a portion of a local update module usable in a compute engine of an AI accelerator.

As discussed herein, compute engines 120 and 200 utilize LU modules 140 and 240, respectively. FIG. 7 depicts an embodiment of a portion of LU module 700 analogous to LU modules 140 and 240, respectively. LU module 700 is configured for a CIM module analogous to the CIM module depicted in FIG. 3. LU module 700 includes sense circuitry 706 (of which only one is labeled), write circuitry 742, and adder circuitry 744. Write circuitry 742 and adder circuitry 744 are analogous to write circuitry 242 and vector adder 244, respectively. Sense circuitry 706 is coupled with each column of SRAM cells (not shown) of the CIM module (not explicitly shown). Also depicted is address decoder 770 that is analogous to address decoder 270.

Address decoder 770 selects the desired SRAM cell (not shown) of the CIM module via line 718 (of which only one is labeled). Sense circuitry 706 reads the value of the weight stored in the corresponding SRAM cell and provides the current weight to vector adder 744. The weight update (ΔW) is input to vector adder 744. Vector adder 744 adds the weight update to the weight and provides the updated weight to weight circuitry 742. Write circuitry 742 writes the updated weights back to the corresponding SRAM cell. Thus, the portion of LU module 700 allows the weights in a CIM module to be updated locally. In some embodiments, a ternary update is used in updating the weights. In such embodiments, adder 742 may be replaced by a simple increment/decrement circuitry. In case of overflow, the updated weight may be saturated (e.g. to correspond to all ones of a binary number). Although LU module 700 is depicted in the context of SRAM cells, a similar architecture may be used for other embodiments such as resistive RAM cells.

Using LU module 700, particularly in the context of compute engine 200, a local weight update may be performed for storage cells of a CIM module. This may reduce the data movement that may otherwise be required for weight updates. Consequently, the time taken for training may be dramatically reduced. Efficiency and performance of a compute engine, as well as the learning network for which the compute engine is used, may be improved.

Figure 8:
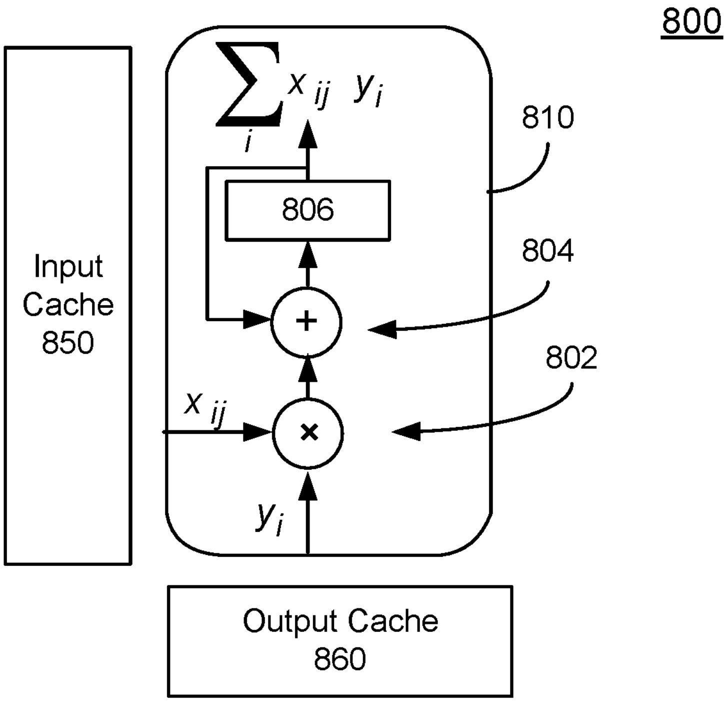
FIG. 8 depicts an embodiment of a weight update calculator usable in a compute engine of an AI accelerator.

FIG. 8 depicts an embodiment of weight update calculator 800 usable in conjunction with a compute engine, such as compute engine(s) 120 and/or 200. In some embodiments, weight update calculator 800 is a batched weight update calculator. Also shown in FIG. 8 are input cache 850 and output cache 860 analogous to input cache 250 and output cache 260, respectively. Weight update calculator 800 may be analogous to weight update calculator 246 of compute engine 200. In some embodiments, batched updates are used. Stated differently, the changes to the weights obtained based on the error (e.g. the loss function—the difference between the target outputs and the learning network outputs) are based on multiple inferences. These weight changes are averaged (or otherwise subject to statistical analysis). The average weight change may be used in updating the weight. The changes in the weights are also determined using an outer product. The outer product of two vectors is a matrix having entries formed of by the product of an element in the first vector with another element in the second vector.

Weight update calculator 800 includes scaled vector accumulator (SVA) 810, which may be used to perform the desired outer product and average the weight updates for the batch. Output cache 860 passes the data row by row ($y_i$) that is scaled (multiplied) by its corresponding $x_{ij}$, where j is the index of the row to be updated. SVA 810 performs the product of $x_{ij}$ and $y_i$ using element 802 and adds this to the prior entries at element 804. The output is stored in register 806. For further entries, the output of register 806 may be provided back to summation element 804 to be added to the next product. The output of SVA 810 is $\Sigma_i x_{ij} y_i$. In some embodiments, the output of SBA 810 multiplied by a scalar, which may represent the learning rate divided by the batch size for fixed precision update. In case of ternary update, the output of SVA 810 may simply correspond to {−1, 0, 1} signals. This output is passed to an adder analogous to adders 244 and 744 as ΔW. Thus, weight update calculator 800, and more particularly SVA 810, may be used to determine the updates to weights. This may occur locally. In some embodiments, SVA 810, caches, and the update signals can be shared among the systems (e.g. compute engines) and/or tiles to save the resources. If equilibrium propagation is used to determine the weight update (e.g. instead of a technique such as back propagation), the resultants of free and clamped inferences are utilized. In such embodiments input cache 850 and output cache 860 may be divided to be capable of storing data for free and clamped states. In embodiments using equilibrium propagation, the two SVAs (one for the clamped state and one for the free state) may be used. In such embodiments, the outputs of the two SVAs are then subtracted to obtain the weight update. In some embodiments, the caches 850 and 860 have a bit size of 2*batch size*(number of columns of SRAM/weight precision)*(input/output precision).

In some embodiments, SVA 810 also may be used to apply the activation function to the outputs stored in output cache 860. An activation function may be mathematically represented by a summation of a power series. For example, a function, f, may be represented as $f=\Sigma a_i x_i$, where $a_i$ are the coefficients of the power series and x is the input variable. If SVA 810 is used to apply the activation function in addition to the partial sum accumulation, dedicated hardware need not be provided for the activation function. Thus, in addition to the benefits of local weight updates, such a system may occupy less area.

Compute engines, such as compute engines 120 and/or 200 may greatly improve the efficiency and performance of a learning network. Storage of the weights in CIM module(s) 130 and/or 230 may be analog or digital and such modules may take the form of analog or digital SRAM, resistive RAM, or another format. The use of CIM module(s) 130 and/or 230 reduce the time to perform the vector-matrix multiplication. Thus, performing inference(s) using system 100 and/or compute engine 200 may require less time and power. LU modules 140 and/or 240 perform local updates to the weights stored in the cells of CIM module 130 and/or 230. For example, sense circuitry 706, vector adder 744, and write circuitry 742 allow for CIM module 230 to be locally read, updated, and re-written. This may reduce the data movement that may otherwise be required for weight updates. The use of sequential weight update calculators, for example including SVA 810 allows for local calculation of the weight updates. Consequently, the time taken for training may be dramatically reduced. Further, the activation function for the learning network may also be applied by SVA 810. This may improve efficiency and reduce the area consumed by a system employing compute engine 200. Efficiency and performance of a learning network provided using compute engine 200 may be increased.

Figure 9:
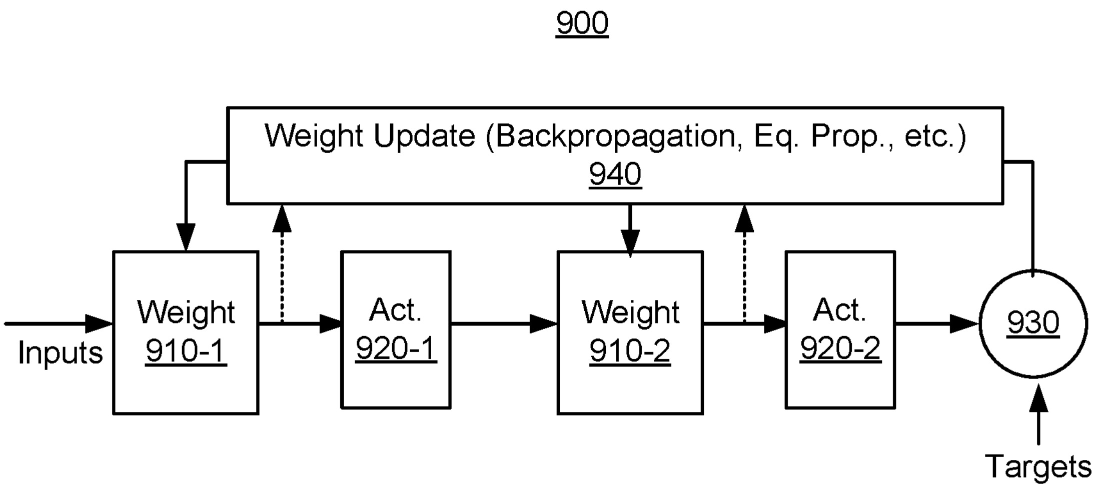
FIG. 9 depicts an embodiment of the data flow in a learning network.

For example, FIG. 9 depicts an embodiment of data flow in learning network 900 that can be implemented using system 100 and/or compute engine 200. Learning network 900 includes weight layers 910-1 and 910-2 (collectively or generically 910) and activation layers 920-1 and 920-2 (collectively or generically 920). For training, loss function calculator 930 as well as weight update block 940 are shown. Weight update block 940 might utilize techniques including but not limited to back propagation, equilibrium propagation, feedback alignment and/or some other technique (or combination thereof). In operation, an input vector is provided to weight layer 910-1. A first weighted output is provided from weight layer 910-1 to activation layer 920-1. Activation layer 920-1 applies a first activation function to the first weighted output and provides a first activated output to weight layer 920-2. A second weighted output is provided from weight layer 910-2 to activation layer 920-2. Activation layer 920-2 applies a second activation function to the second weighted output. The output of is provided to loss calculator 930. Using weight update technique(s) 940, the weights in weight layer(s) 910 are updated. This continues until the desired accuracy is achieved.

System 100 and compute engine 200 may be used to accelerate the processes of learning network 900. For simplicity, it is assumed that compute engine 200 is used for compute engines 120. Further, weight layers 910 are assumed to be storable within a single CIM module 230. Nothing prevents weight layers 910 from being extended across multiple CIM modules 230. In the data flow described above for learning network 900, an input vector is provided to CIM module 130-1/230 (e.g. via input cache 250 and DAC(s) 202). Initial values of weights are stored in, for example, SRAM cells 310 of CIM module 230. A vector matrix multiplication is performed by CIM module 230 and provided to output cache 260 (e.g. also using aBit mixers 204 and ADC(s) 206). Thus, the processes of weight layer 910-1 may be performed. Activation layer 920-1 may be performed using a processor such as processor 110 and/or an SVA such as SVA 810. The output of activation layer 920-1 (e.g. from SVA 810) is provided to the next weight layer 910-2. Initial weights for weight layer 910-2 may be in another CIM module 130-2/230. In another embodiment, new weights corresponding to weight layer 910-2 may be stored in the same hardware CIM module 130-1/230. A vector matrix multiplication is performed by CIM module 230 and provided to output cache 260 (e.g. also using aBit mixers 204 and ADC(s) 206). Activation layer 920-2 may be performed using a processor such as processor 110 and/or an SVA such as SVA 810. The output of activation layer 920-2 is used to determine the loss function via hardware or processor 110. The loss function may be used to determine the weight updates by processor 110, weight update calculator 246/800, and/or SVA 810. Using LU modules 240, the weights in CIM modules 230, and thus weight layers 910 may be updated. Thus, learning network 900 may by realized using system 100 and/or compute engine 200. The benefits thereof may, therefore, be obtained.

Figure 10A:
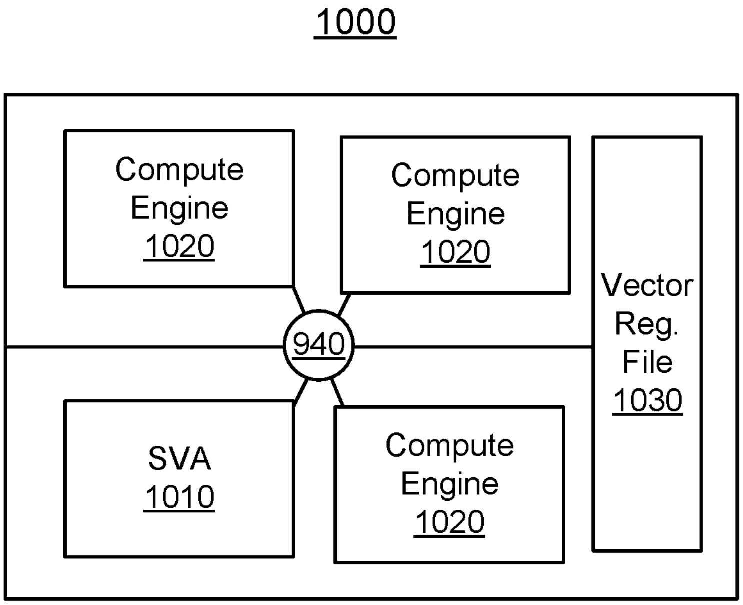
FIGS. 10A-10B depict an embodiment of an architecture including compute engines and usable in an AI accelerator.
Figure 10B:
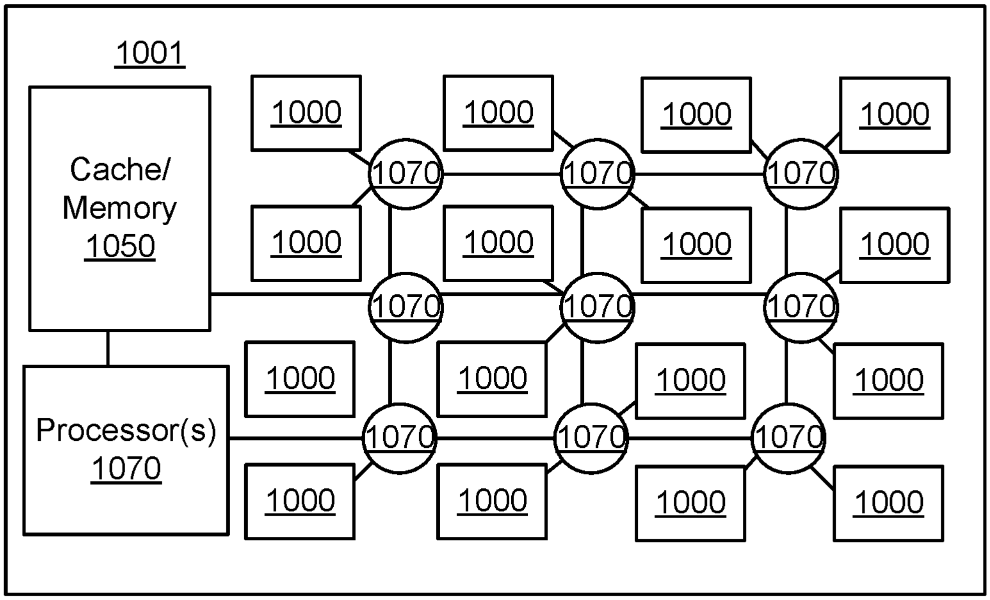

Compute engines 120 and/or 200 may be combined in a variety of architectures. For example, FIGS. 10A-10B depict an embodiment of an architecture including compute engines 1020 and usable in an AI accelerator. The architecture includes tile 1000 depicted in FIG. 10A. Tile 1000 includes SVA 1010, compute engines 1020, router 1040, and vector register file 1030. Although one SVA 1010, three compute engines 1020, one vector register file 1030, and one router 1040 are shown, different numbers of any or all components 1010, 1020, 1030, and/or 1040 may be present.

Compute engines 1020 are analogous to compute engine (s) 120 and/or 200. Thus, each compute engine 1020 has a CIM module analogous to CIM module 130/230 and an LU module analogous to LU module 140/240. In some embodiments, each compute engine 1020 has the same size (e.g. the same size CIM module). In other embodiments, compute engines 1020 may have different sizes. Although not indicated as part of compute engines 1020, SVA 1010 may be analogous to weight update calculator 246 and/or SVA 810. Thus, SVA 1010 may determine outer products for weight updates, obtain partial sums for weight updates, perform batch normalization, and/or apply activation functions. Input vectors, weights to be loaded in CIM modules, and other data may be provided to tile 1000 via vector register file 1030. Similarly, outputs of compute engines 1020 may be provided from tile 1000 via vector register file 1020. In some embodiments, vector register file 1040 is a two port register file having two read and write ports and a single scalar read. Router 1040 may route data (e.g. input vectors) to the appropriate portions of compute engines 1020 as well as to and/or from vector register file 1030.

FIG. 10B depicts an embodiment of higher level architecture 1001 employing multiple tiles 1000. An AI accelerator may include or be architecture 1001. In some embodiments, architecture 1001 may be considered a network on a chip (NoC). Architecture 1001 may also provide extended data availability and protection (EDAP) as well as a significant improvement in performance described in the context of system 100 and embodiments of compute engine 200. In addition to tiles 1000, architecture 1001 includes cache (or other memory) 1050, processor(s) 1060, and routers 1070. Other and/or different components may be included. Processor(s) 1060 may include one or more RISC processors, which control operation and communication of tiles 1000. Routers 1070 route data and commands between tiles 1000.

Figure 11:
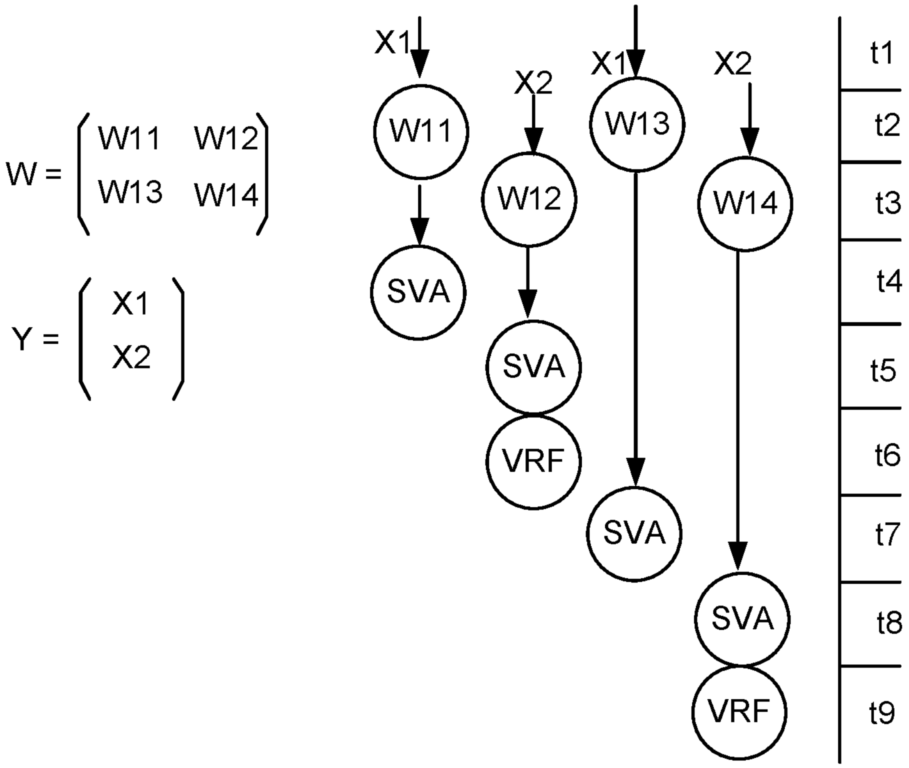
FIG. 11 depicts an embodiment of the timing flow for an architecture including compute engines and usable in an AI accelerator.

For example, FIG. 11 depicts the timing flow 1100 for one embodiment of a learning system, such as for tile 1000. The matrix of weights, W, as well as the input vector, Y, are also shown. Weights, W, are assumed to be stored in four CIM modules 230 as W11, W12, W13, and W14. Thus, four compute engines 1020 are used for timing flow 1100. For tile 1000, one compute engine 1020 being used for weights, W, is on another tile. At time t1, portion X1 of input vector Y is provided from vector register file 1030 to two compute engines 1020 that store W11 and W13. At time t2, two tasks are performed in parallel. The vector matrix multiplication of W11 and W13 by X1 is performed in the CIM modules of two compute engines 1020. In addition, portion X2 of input vector Y is provided to from vector register file(s) 1030 two compute engines 1020. At time t3, the vector matrix multiplication of W12 and W14 by X2 is performed in the CIM modules of two compute engines 1020. At times t4 and t5, the outputs of the vector matrix multiplications of W11 and W12 are loaded to SVA 1010. SVA 1010 accumulates the result, which is stored in vector register file 1030 at time t6. A similar process is performed at times t7, t8, and t9 for the outputs of the vector matrix multiplications of W13 and W14. Thus, tiles 1000 may be efficiently used to perform a vector matrix multiplication as part of an inference during training or use of tiles 1000. Once this is complete, the output may be moved to another tile for accumulation by the SV 1040 of that tile or the activation function may be applied. In some embodiments, the activation function may be applied by a processor such as processor 1070 or by SVA 1010.

Using tiles 1000 and/or architecture 1001, the benefits of system 100 and/or compute engine 200 may be extended. Thus, efficiency and performance of a deep learning network using a large number of parameters, or weights, may be improved.

Figure 12:
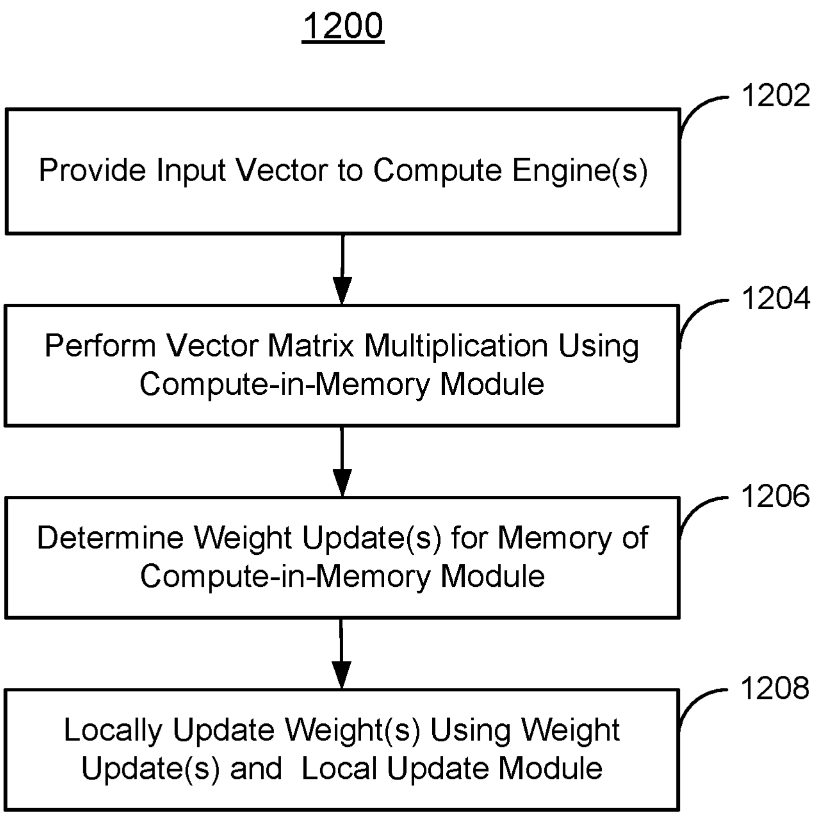
FIG. 12 is a flow chart depicting one embodiment of a method for using a compute engine usable in an AI accelerator for training.

FIG. 12 is a flow chart depicting one embodiment of method 1200 for using a compute engine for training. Method 1200 is described in the context of compute engine 200. However, method 1200 is usable with other compute engines, such as compute engines 120, 200, and/or 1020. Although particular processes are shown in an order, the processes may be performed in another order, including in parallel. Further, processes may have substeps.

An input vector is provided to the compute engine(s), at 1202. A vector-matrix multiplication is performed using a CIM module(s) of the compute engine(s), at 1204. Thus, the input vector is multiplied by the weights stored in the CIM module(s). The weight update(s) for the weights are determined, at 1206. In some embodiments, 1206 utilizes techniques such as back propagation, equilibrium propagation, and/or feedback alignment. These weight updates may be determined in the compute engine(s) or outside of the compute engine(s) and/or tiles. At 1208, the weights are locally updated using the weight update(s) determined at 1206.

For example, for compute engine 200, an input vector is provided to the input cache 250, at 1202. A vector-matrix multiplication is performed using CIM module 230, at 1204. In some embodiments, 1204 includes converting a digital input vector to analog via DAC(s) 202, performing a vector-matrix multiplication using CIM module 230, performing analog bit mixing using aBit mixers 204, accomplishing the desired analog to digital conversion via ADC(s) 206, and storing the output in output cache 206. The weight updates for CIM module 230 are determined at 2106. This may include use of SVA 810 for accumulation, batched normalization, and/or other analogous tasks. At 1208, the weights in CIM module 230 are locally updated using the weight update(s) determined at 1206 and LU module 240. For example, SRAM cells 310 of CIM module 230 may be read using sense circuitry 706, combined with the weight updated using vector adder 744, and rewritten to the appropriate SRAM cell 310 via write circuitry 742.

Method 1200 thus utilizes hardware CIM module(s) for performing a vector-matrix multiplication. Further, an LU module may be used to update the weights in CIM module (s). Consequently, both the vector-matrix multiplication of the inference and the weight update may be performed with reduced latency and enhanced efficiency. Thus, performance of method 1200 is thus improved.

Figure 13:
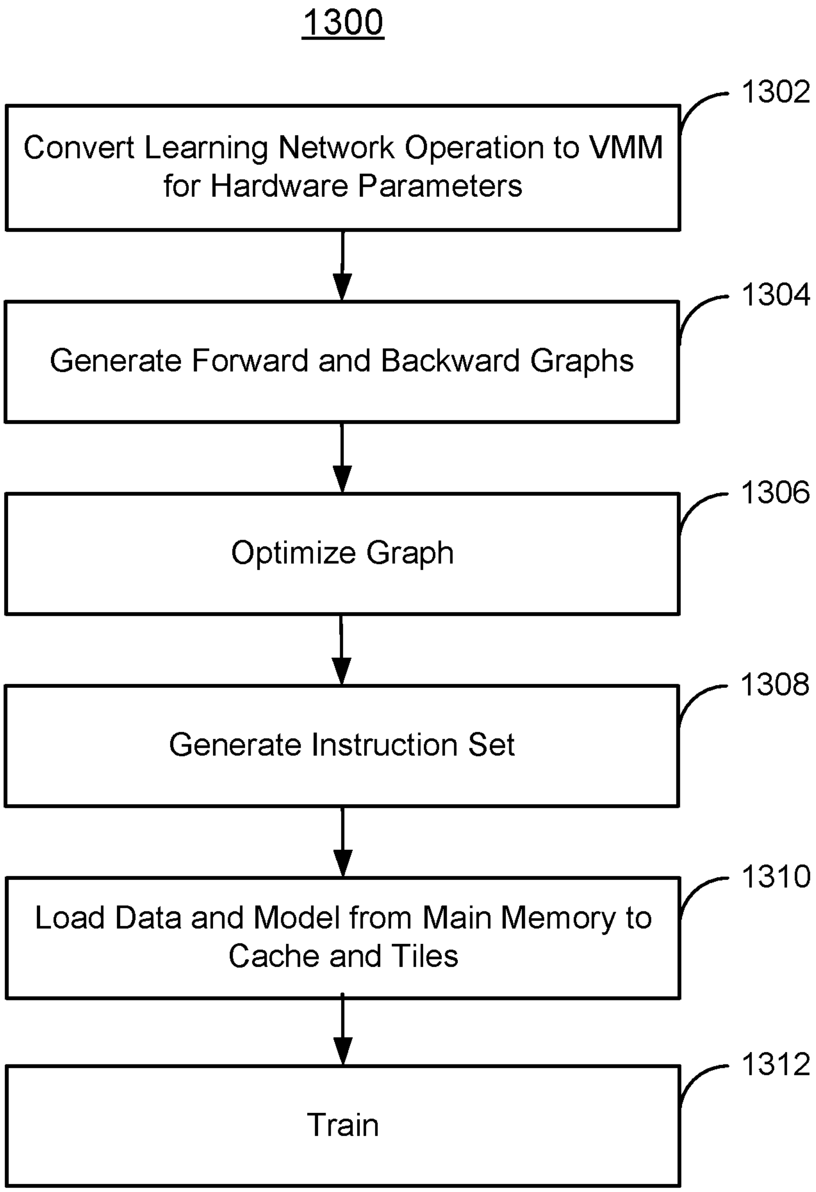
FIG. 13 is a flow chart depicting one embodiment of a method for providing a learning network on a compute engine.

FIG. 13 is a flow chart depicting one embodiment of method 1300 for providing a learning network on a compute engine. Method 1300 is described in the context of compute engine 200. However, method 1300 is usable with other compute engines, such as compute engines 120, 200, and/or 1020. Although particular processes are shown in an order, the processes may be performed in another order, including in parallel. Further, processes may have sub steps.

Method 1300 commences after the neural network model has been determined. Further, initial hardware parameters have already been determined. The operation of the learning network is converted to the desired vector-matrix multiplications given the hardware parameters for the hardware compute engine, at 1304. The forward and backward graphs indicating data flow for the desired training techniques are determined at 1304. Further, the graphs may be optimized, at 1306. An instruction set for the hardware compute engine and the learning network is generated, at 1308. The data and model are loaded to the cache and tile(s) (which include the hardware compute engines), at 1310. Training is performed, and 1312. Thus, method 1200 may be considered to be performed at 1312.

Using method 1300, the desired learning network may be adapted to hardware compute engines, such as compute engines 120, 200, and/or 1020. Consequently, the benefits described herein for compute engines 120, 200, and/or 1020 may be achieved for a variety of learning networks and applications with which the learning networks are desired to be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a plurality of compute engines coupled with the processor, the plurality of compute engines including a compute-in-memory (CIM) hardware module, a bit mixer, and a local update module, the CIM hardware module storing a plurality of weights corresponding to a matrix and configured to perform a vector-matrix multiplication (VMM) for the matrix, the local update module being coupled with the CIM hardware module and configured to update at least a portion of the plurality of weights, wherein:
the bit mixer is coupled to the CIM and configured to combine results from the CIM into a weighted output by using exponential weights and bit slicing;
the CIM hardware module includes a plurality of cells for storing the plurality of weights; and
the local update module includes:
an adder configured to be selectively coupled with each of the plurality of cells, to receive a weight update, and to add the weight update with a weight of the plurality of weights for each of the plurality of cells; and
write circuitry coupled with the adder and the plurality of cells, the write circuitry configured to write a sum of the weight and the weight update to each of the plurality of cells, and
a compute engine of the plurality of compute engines includes:
a controller configured to provide a plurality of control signals to the CIM hardware module and the local update module,
a first portion of the plurality of control signals corresponding to an inference mode, a second portion of the plurality of control signals corresponding to a weight update mode,
wherein the weight update mode includes providing the weight update to the adder.

2. The system of claim 1, wherein the plurality of cells is selected from a plurality of analog static random access memory (SRAM) cells, a plurality of digital SRAM cells, and a plurality of resistive random access memory (RRAM) cells.

3. The system of claim 2, wherein the plurality of cells includes the plurality of analog SRAM cells, the CIM hardware module further including a capacitive voltage divider for each of the plurality of analog SRAM cells.

4. The system of claim 1, wherein the local update module further includes: a local batched weight update calculator coupled with the adder and configured to determine the weight update.

5. The system of claim 1, wherein each of the plurality of compute engines further includes: address circuitry configured to selectively couple the adder and the write circuitry with any of the plurality of cells.

6. The system of claim 1, wherein the plurality of weights includes at least one positive weight and at least one negative weight.

7. The system of claim 1, further comprising:
a scaled vector accumulation (SVA) unit coupled with the plurality of compute engines and the processor, the SVA unit configured to apply an activation function to an output of the plurality of compute engines.

8. The system of claim 7, wherein the SV A unit and the plurality of compute engines are in a plurality of tiles.

9. The system of claim 1, wherein the bit mixer is coupled to an analog-to-digital converter (ADC) that is coupled to an output cache, the output cache being configured to pass data by rows.

10. The system of claim 1, wherein the CIM module is configured to perform the VMM by mapping the plurality of weights to bipolar weights and multiplying the matrix with an input vector and scaling the multiplication result based on a symmetric range.

11. The system of claim 1, wherein the compute engine is further configured to comprise an input cache, a control unit, and an output cache.

12. A machine learning system, comprising:

at least one processor; and a plurality of tiles coupled with the at least one processor, the plurality of tiles including a plurality of compute engines and at least one scaled vector accumulation (SVA) unit, the SVA unit configured to apply an activation function to an output of the plurality of compute engines the plurality of compute engines being interconnected and coupled with the SV A unit, each of the plurality of compute engines including at least one compute-in-memory (CIM) hardware module, a controller, a bit mixer and at least one local update module, the at least one CIM hardware module including a plurality of static random access memory (SRAM) cells storing a plurality of weights corresponding to a matrix, the at least one CIM hardware module being configured to perform a vector-matrix multiplication (VMM) for the matrix, the at least one local update module being coupled with the at least one CIM hardware module and configured to update at least a portion of the plurality of weights, the controller being configured to provide a plurality of control signals to the at least one CIM hardware module and the at least one local update module, a first portion of the plurality of control signals corresponding to an inference mode, a second portion of the plurality of control signals corresponding to a weight update mode, wherein:

the bit mixer is coupled to the CIM and configured to combine results from the CIM into a weighted output by using exponential weights and bit slicing; and a local update module of the at least one local update module includes:

an adder configured to be selectively coupled with each of the plurality of SRAM cells, to receive a weight update, and to add the weight update with a weight of the plurality of weights for each of the plurality of SRAM cells; and write circuitry coupled with the adder and the plurality of SRAM cells, the write circuitry configured to write a sum of the weight and the weight update to each of the plurality of SRAM cells, wherein the weight update mode includes providing the weight update to the adder.

13. The machine learning system of claim 12, wherein each of the plurality of compute engines further includes address circuitry configured to selectively couple the adder and the write circuitry with each of the plurality of SRAM cells.

14. A method, comprising:

providing an input vector to a plurality of compute engines coupled with a processor, the plurality of compute engines including a compute-in-memory (CIM) hardware module, a bit mixer, and a local update module, the CIM hardware module storing a plurality of weights corresponding to a matrix in a plurality of cells and configured to perform a vector-matrix multiplication (VMM), the local update module being coupled with the CIM hardware module and configured to update at least a portion of the plurality of weights, wherein the bit mixer is configured to combine results from the CIM into a weighted output by using exponential weights and bit slicing;

performing the VMM of the input vector and the matrix using the plurality of compute engines;

determining at least one weight update for the plurality of weights; and locally updating the plurality of weights using the at least one weight update and the local update module, wherein:

a compute engine of the plurality of compute engines includes:

a controller configured to provide a plurality of control signals to the CIM hardware module and the local update module, a first portion of the plurality of control signals corresponding to an inference mode, a second portion of the plurality of control signals corresponding to a weight update mode, wherein the weight update mode includes providing the at least one weight update to an adder; and the locally updating of the plurality of weights includes:

adding, using the adder configured to be selectively coupled with each of the plurality of cells, the at least one weight update to a weight of at least a portion of the plurality of weights for each of the plurality of cells; and writing, using write circuitry coupled with the adder and the plurality of cells, a sum of the weight and the weight update to each of the plurality of cells.

15. The method of claim 14, wherein the plurality of cells is selected from a plurality of analog static random access memory (SRAM) cells, a plurality of digital SRAM cells, and a plurality of resistive random access memory (RRAM) cells.

16. The method of claim 14, wherein the plurality of weights includes at least one positive weight and at least one negative weight.

17. The method of claim 14, further comprising: applying an activation function to an output of the plurality of compute engines.

18. The method of claim 17, wherein the applying further includes: using a scaled vector accumulation (SV A) unit coupled with the plurality of compute engines to apply the activation function to the output of the plurality of compute engines.

19. The method of claim 14, wherein the bit mixer is coupled with the CIM module and an analog-to-digital converter (ADC) that is coupled to an output cache, the output cache being configured to pass data by rows.

20. The method of claim 14, wherein the CIM module is configured to perform the VMM by mapping the plurality of weights to bipolar weights and multiplying the matrix with an input vector and scaling the multiplication result based on a symmetric range.

* * * * *